US007982738B2

(12) United States Patent
Jojic et al.

(10) Patent No.: US 7,982,738 B2
(45) Date of Patent: Jul. 19, 2011

(54) INTERACTIVE MONTAGES OF SPRITES FOR INDEXING AND SUMMARIZING VIDEO

(75) Inventors: Nebojsa Jojic, Redmond, WA (US); Chris Pal, Waterloo (CA)

(73) Assignee: Microsoft Corporation, Redmond, WA (US)

( * ) Notice: Subject to any disclaimer, the term of this patent is extended or adjusted under 35 U.S.C. 154(b) by 1789 days.

(21) Appl. No.: 11/004,760

(22) Filed: Dec. 1, 2004

(65) Prior Publication Data

US 2006/0117356 A1    Jun. 1, 2006

(51) Int. Cl.
*G06T 13/00* (2006.01)
(52) U.S. Cl. .................... 345/473; 345/683; 345/950
(58) Field of Classification Search .................. None
See application file for complete search history.

(56) References Cited

U.S. PATENT DOCUMENTS

| | | | | | |
|---|---|---|---|---|---|
| 5,731,810 | A | * | 3/1998 | Oda | 345/551 |
| 5,793,351 | A | * | 8/1998 | Leach | 345/683 |
| 5,818,466 | A | * | 10/1998 | Ryu | 345/573 |
| 5,943,445 | A | * | 8/1999 | Dufaux | 382/236 |
| 5,969,755 | A | * | 10/1999 | Courtney | 348/143 |
| 6,069,633 | A | * | 5/2000 | Apparao et al. | 345/421 |
| 6,075,875 | A | * | 6/2000 | Gu | 382/107 |
| 6,259,828 | B1 | * | 7/2001 | Crinon et al. | 382/305 |
| 7,084,877 | B1 | * | 8/2006 | Panusopone et al. | 345/474 |
| 7,113,185 | B2 | | 9/2006 | Jojic et al. | |
| 7,256,797 | B2 | * | 8/2007 | Yoshida | 345/619 |

OTHER PUBLICATIONS

A.Yuille, L.Vincent, and D.Geiger. J., "Statistical Morphology and Bayesian Reconstruction," Journal of Mathematical Imaging and Vision, vol. 1, No. 3, pp. 223-238, Aug. 1992.

J. Boreczky, A. Girgensohn, G. Golovchinsky, and S. Uchihashi. An interactive comic book presentation for exploring video. In Proceedings of the SIGCHI conference on Human factors in computing systems, pp. 185-192. ACM Press, 2000.
H. Chalidabhongse, K. Kim, D. Harwood, and L. Davis. A perturbation method for evaluating background subtraction algorithms. Joint IEEE International Workshop on Visual Surveillance and Performance Evaluation of Tracking and Surveillance, Nice, France, Oct. 11-12,2003.
M. G. Christel, M. A. Smith, C. R. Taylor, and D. B. Winkler. Evolving video skims into useful multimedia abstractions. Proceedings of the ACM CHI '98 Conference on Human Factors in Computing Systems, Apr. 1998.
A. Dempster, N. Laird, and D. Rubin. Maximum likelihood from incomplete data via the em algorithm. Journal of the Royal Statistical Society, Series B, 39:1-38, 1977.
M. Irani and P. Anandan. Video indexing based on mosaic representations. 86:905-921, May 1998.

(Continued)

*Primary Examiner* — Said Broome
(74) *Attorney, Agent, or Firm* — Lyon & Harr, LLP; Mark A. Watson

(57) ABSTRACT

A "Video Browser" provides interactive browsing of unique events occurring within an overall video recording. In particular, the Video Browser processes the video to generate a set of video sprites representing unique events occurring within the overall period of the video. These unique events include, for example, motion events, security events, or other predefined event types, occurring within all or part of the total period covered by the video. Once the video has been processed to identify the sprites, the sprites are then arranged over a background image extracted from the video to create an interactive static video montage. The interactive video montage illustrates all events occurring within the video in a single static frame. User selection of sprites within the montage causes either playback of a portion of the video in which the selected sprites were identified, or concurrent playback of the selected sprites within a dynamic video montage.

36 Claims, 6 Drawing Sheets

OTHER PUBLICATIONS

N. Jojic and B. Frey. Learning flexible sprites in video layers, 2001.

M. I. Jordan, Z. Ghahramani, T. S. Jaakkola, and L. K. Saul. An introduction to variational methods for graphical models. Kluwer, 1998.

R. Lienhart. Dynamic video summarization of home video. SPIE 3972: Storage and Retrieval for Media Databases, pp. 378-389, 2000.

F. Shipman, A. Girgensohn, and L. Wilcox. Generation of interactive multi-level video summaries. In Proceedings of the eleventh ACM international conference on Multimedia, pp. 392-401. ACM Press, 2003.

C. Stauffer and W. Grimson. Adaptive Background mixture models for real-time tracking. CVPR'99, 2:246-252, Jun. 1999.

E. Stringa. Morphological change detection algorithms for surveillance applications. Proceedings of the British Machine Vision Conference (BMVC) 2000, Bristol, UK, Sep. 11-14, 2000.

R. Szeliski, P. Anandan, and S. Baker. From 2d images to 2.5d sprites: A layered approach to modeling 3d scenes. 1:44-50.

Y. Taniguchi, A. Akutsu, and Y. Tonomura. Panoramaexcerpts: Extracting and packing panoramas for video browsing. In Proc. ACM Multimedia 97, pp. 427-436, 1997.

J. Wang and E. Adelson. Representing moving images with layers. 5(3):625-638.

M. M. Yeung and Y. Boon-Lock. Video visualization for compact presentation and fast browsing of pictorial content. IEEE Transactions on Circuits and Systems for Video Technology, 7(5), 1997.

H. J. Zhang, C. Y. Low, S. W. Smoliar, and J. H. Wu. Video parsing, retrieval and browsing: an integrated and content-based solution. In Proceedings of the third ACM international conference on Multimedia, pp. 15-24. ACM Press, 1995.

* cited by examiner

INTERACTIVE MONTAGES OF SPRITES FOR INDEXING AND SUMMARIZING VIDEO

BACKGROUND

1. Technical Field

The invention is related to video scene analysis, and in particular, to a system and method for providing interactive browsing of a video recording which has been pre-processed generate a montage of user-interactive video sprites overlaid on a background of a scene covered by the video recording, with each sprite corresponding to a unique event occurring within all or part of the total period covered by the video recording.

2. Related Art

Many video recordings, such as, for example security videos, typically record video of a particular area or region over long periods of time. A manual review of the video to determine whether anything of interest has occurred during the period of the recording is typically a time consuming process, especially for long video recordings. While this process can be speeded up to a degree by watching the video in faster than real-time, playing the video too fast runs the risk of the viewer missing important events in the video that might otherwise be of interest. Consequently, the task of finding relevant information in a long video using only fast forward and rewind operations is often a both a time consuming and error prone task.

In an attempt to address this issue, a number of partially or fully automated schemes based on the concept of video "key frames" have been advanced for retrieving and browsing video. In general, such schemes operate by identifying and extracting particular frames (i.e., key frames) in a video sequence which meet some predefined criteria, such as motion detection, target object detection, color detection, change detection, etc.

For example, conventional change detection methods, including pixel-based, and region-based methods, are a common way to detect events of interest in video surveillance and security applications. Typically, conventional "background subtraction" methods are used in combination with these change detection methods in algorithms for identifying video key frames. In general, such change detection methods often use a threshold value to determine whether a region of an image has changed to a sufficient degree with respect to the background. Such change detection techniques have been further improved by applying "classical" morphological filters or statistically based morphological filters to "clean up" initial pixel level change detection, making detection thresholds more robust.

Regardless of what methods are used to identify the key frames, once they have been identified, there are number of schemes that have been adapted to organize the key frames into user selectable indexes back into the original video. For example, one conventional key frame based scheme organizes the key frames into interactive "comic books." A similar scheme organizes the key frames into "video posters." In general, both of these schemes use different key frame layout schemes to provide the user with a number of user-selectable key frames that are indexed to the original video. In other words, the extracted key frames are typically presented as a series of individual images to the user. The user will then select a particular key frame as an entry point into the video so as to play back a portion of the video beginning at or near the time index associated with the selected key frame. Unfortunately, one problem with such schemes is that as the length of the video increases, the number of key frames also typically increases. As a result, typical key frame indices can be difficult or time consuming for a user to quickly review.

Another scheme provides mosaic representations for representing motion events detected in a video sequence. In general, this scheme generates static mosaic images from particular "scenes" within an overall video recording. These mosaic images are designed to represent motion events by either displaying a static sequence of particular moving objects against a static mosaic image of the underlying background of the video sequence, or by displaying a trajectory line or vector representing the particular path of moving objects within the overall static mosaic image.

However, one problem with the aforementioned mosaicing scheme is that it relies on "scene-cut" or "scene-change" information that is either embedded or identified within the video to segment particular scenes, with each scene then being used as the basis for creating a separate mosaic. These individual scenes are detected as "drastic changes in the frame content." Consequently, in the case of a security video, which typically covers the same "scene" over very long periods of time, this mosaic representation scheme may tend to treat the entire video sequence as a single scene. Therefore, as the number of motion events increases, the resulting static mosaic can become a confusing patchwork of large numbers static object sequences or motion vectors overlaid on the static mosaic. Another problem with this mosaicing scheme is that moving objects are represented in the actual positions in which they occurred in the video. Consequently, where more than one moving object was in the same position, those objects may be shown as overlapping or intersecting, even where there is a large temporal difference between the occurrence of the objects or events within the video.

Still other video indexing schemes have attempted to summarize longer videos by generating a shorter video that preserves the frame rate of key elements of certain portions of the original video, while greatly accelerating portions of the video in which nothing of interest is occurring. These schemes are sometimes referred to as "video skimming" techniques. Such schemes often focus on extracting the most "important" aspects of a video into summary clips that are then concatenated to form the video summary or "skim." However, even such video skimming techniques can result in lengthy representations of an overall video recording, especially where the length of the video increases and the number of events of interest within the video increases.

Therefore, what is needed is a system and method for both summarizing video sequences, and providing an interactive index for allowing user entry into particular points or segments of the overall video. In addition, such a system and method should allow a user to quickly review the contents of the video without the need to review individual key frames. Further, in contrast to conventional mosaicing schemes, such a system and method should avoid the display of a static sequence or trajectory line for each moving object detected within the video.

SUMMARY

A "Video Browser," as described herein, operates to solve the aforementioned problems by providing both indexing and interactive visual browsing of unique events occurring within a video recording. These unique events include, for example, motion events, security events, or other predefined event types, occurring within all or part of the total period covered by the video. For example, in the context of security applications, it is typically desired to index a security video that contains relatively rare but important events, such as a security video taken from public or industrial facilities (e.g., an airport, sports arena, nuclear power plant, shopping mall, grocery store, etc.) or merely an exterior home security video recording events outside of a house in a residential neighborhood. The Video Browser addresses this issue by generating a video montage which provides the user with an immediate overview of the entire video recording period.

In general, the Video Browser operates to compile a list of "video clips" containing events that might be of interest to a user, and graphically presenting that list to the user via automatically generated interactive video montages. The Video Browser creates the video montage by first processing the video recording to generate a set of unique "video sprites" corresponding to each unique event occurring within the overall video recording. Once the sprites have been generated, they are then arranged over a common background image extracted from the video to create an interactive static video montage. Note that the arrangement of video sprites may also include scales, shifts, and rotations, so as to fit the sprites within the static video montage with a minimum of overlap or occlusion.

The interactive static video montage illustrates all events occurring within the video in a single static frame. User selection of sprites within the static montage causes either playback of a portion of the video in which the selected sprites were identified, or concurrent playback of the selected sprites within an interactive dynamic video montage. In one embodiment, the dynamic video montage temporally compresses and overlays motion events in a video montage of shorter time duration than the original video recording or stream. In either case, the dynamic video montage also acts as an index into the original video stream in the same manner as selection of the sprites in the static video montage, as each of the sprites within the dynamic montage is also user selectable. Further, the motion events corresponding to the animated video sprites overlap in time so as to achieve additional temporal compression of the original video.

In view of the above summary, it is clear that the Video Browser described herein provides a unique system and method for generating interactive sprite-based video montages for indexing and interacting with events of interest in video recordings. Further, it should be noted that one important advantage of the Video Browser described herein is that use of the static and dynamic video montages described herein allows viewers to survey hours of video in the order of minutes. In addition to the just described benefits, other advantages of the Video Browser will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
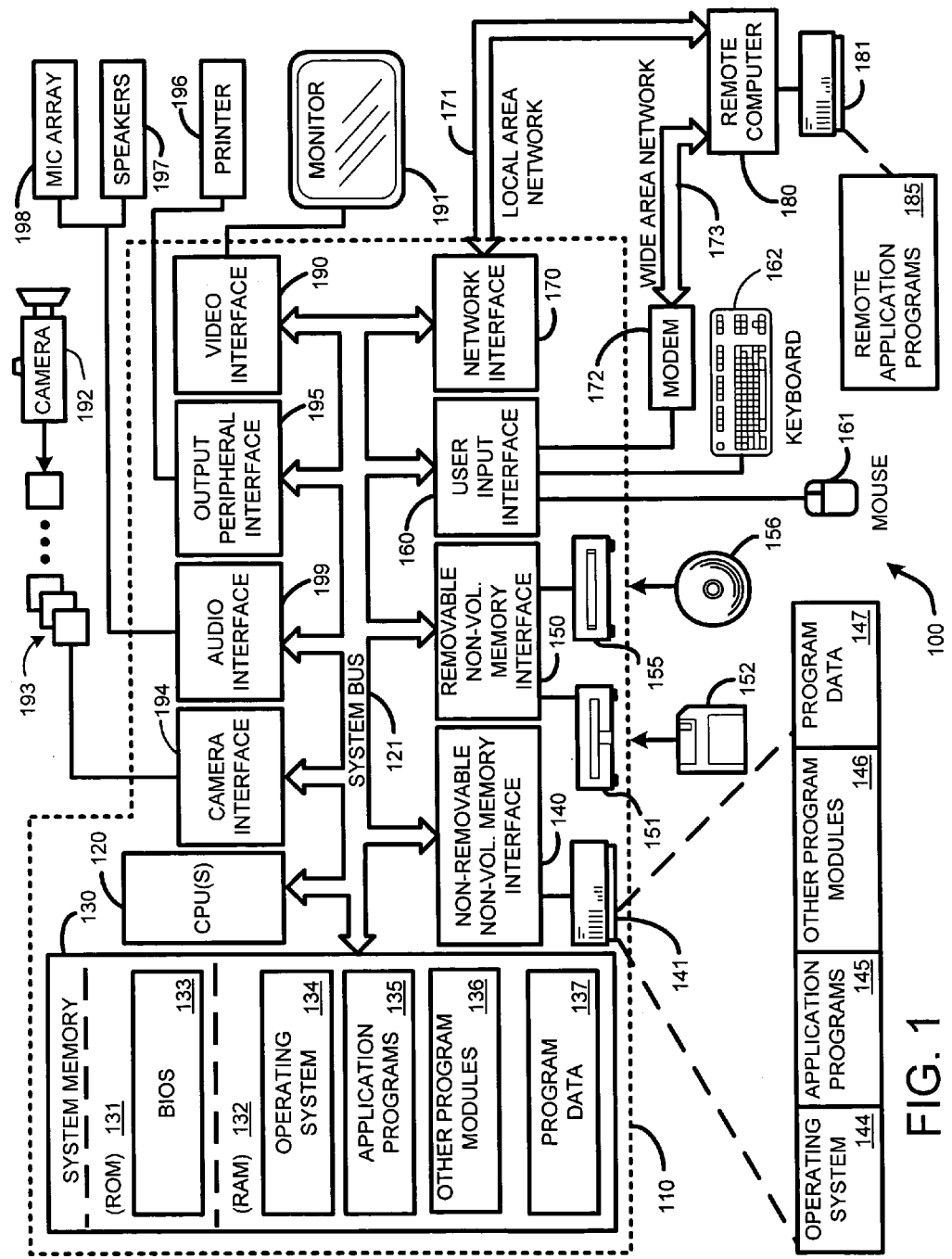
FIG. 1 is a general system diagram depicting a general-purpose computing device constituting an exemplary system implementing a Video Browser, as described herein.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with hardware modules, including components of a microphone array 198. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, as well as a loudspeaker 197 or other sound output device connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor 191, computers may also include other peripheral output devices such as a printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras of various types may be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194 using conventional interfaces, including, for example, USB, IEEE 1394, Bluetooth™, etc. This interface is connected to the system bus 121, thereby allowing the images 193 to be routed to and stored in the RAM 132, or any of the other aforementioned data storage devices associated with the computer 110. However, it is noted that previously stored image data can be input into the computer 110 from any of the aforementioned computer-readable media as well, without directly requiring the use of a camera 192.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying a "Video Browser" which provides automated generation of interactive sprite-based video montages for indexing and interacting with events of interest in video recordings.

2.0 Introduction:

A "Video Browser," as described herein, provides automated generation of interactive sprite-based video montages for indexing and interacting with unique events in a video recording. For example, in the context of security applications, it is typically desired to index a security video that contains relatively rare but important events, such as a security video taken from public or industrial facilities (e.g., an airport, sports arena, nuclear power plant, shopping mall, grocery store, etc.) or merely an exterior home security video recording events outside of a house in a residential neighborhood. Note that for purposes of explanation, the terms "events of interests," "unique events," or simply "events," will be used to generically refer to events of various types, including, for example, motion events, security events, or other predefined event types. Such events are detected within the video using conventional video change detection methods such as motion detection, color changes, target or object recognition techniques, etc.

2.1 System Overview:

As noted above, the Video Browser described herein provides a system and method for generating interactive sprite-based video montages for indexing and interacting with events of interest in video recordings. In general, the Video Browser operates to compile a list of "video clips" containing events that might be of interest to a user, and graphically presenting that list to the user via automatically generated interactive video montages which provide the user with an immediate overview of any events of interest occurring within the video recording or video stream.

While the video recording or stream can be provided from any source, in the simplest embodiment, the Video Browser operates in combination with one or more physical video cameras to capture and record the video stream that is to be processed by the Video Browser. It should be noted that any type of video camera can be used for this purpose. However, is should be appreciated that the use of higher resolution video cameras tends to improve the performance of video sprite generation, as there is simply more pixel information from which to identify unique events of interest and to generate corresponding video sprites. Further, it should also be noted video streams from any conventional source, including, for example, satellite video imagery or television or network broadcast video streams, are also applicable for use with the Video Browser described herein.

The Video Browser creates the video montages by first processing the video recording to generate a set of unique "video sprites" corresponding to each unique event occurring within the overall video recording. The basic idea behind sprite generation is to isolate or identify a particular object or objects within a sequence of images, then to decompose that video sequence into a number of layers, with each layer representing either an object or a background image over the video sequence. Such layered objects are commonly referred to as either "sprites" or "video sprites." Note that this sprite generation is accomplished using conventional sprite generation techniques, as discussed below in further detail in Section 3.4.

Once the sprites have been generated, they are then arranged over a common background image extracted from the video to create an interactive static video montage. Note that the arrangement of video sprites may also include scales, shifts, and rotations, so as to fit the sprites within the static video montage with a minimum of overlap or occlusion. The interactive static video montage illustrates all events occurring within the video in a single static frame. User selection of sprites within the static montage causes either playback of a portion of the video in which the selected sprites were identified, or concurrent playback of the selected sprites within an interactive dynamic video montage.

In one embodiment, the dynamic video montage temporally compresses and overlays motion events in a video montage of shorter time duration than the original video recording or stream. In either case, the dynamic video montage also acts as an index into the original video stream in the same manner as selection of the sprites in the static video montage, as each of the sprites within the dynamic montage is also user selectable. Further, the motion events corresponding to the animated video sprites overlap in time so as to achieve additional temporal compression of the original video.

In addition, both the static and dynamic video montages can be constructed as panoramas. Consequently, in one embodiment, in the case where the camera (or cameras) move or pan to cover a larger region, the background image underlying montages is constructed as a panorama which includes the entire region (or some subset of the entire region) that is covered by the cameras. Note that the construction of panoramas from moving cameras is a concept that is well known to those skilled in the art, and will therefore not be described in any detail herein. With respect to the use of a subset of the region covered by the cameras, this embodiment can be useful in the case where most or all of the events of interest occurred in only a particular region of the area covered by the camera.

The region where the events occur is then used as the montage background with the sprites being overlaid on that background as noted above.

Figure 2:
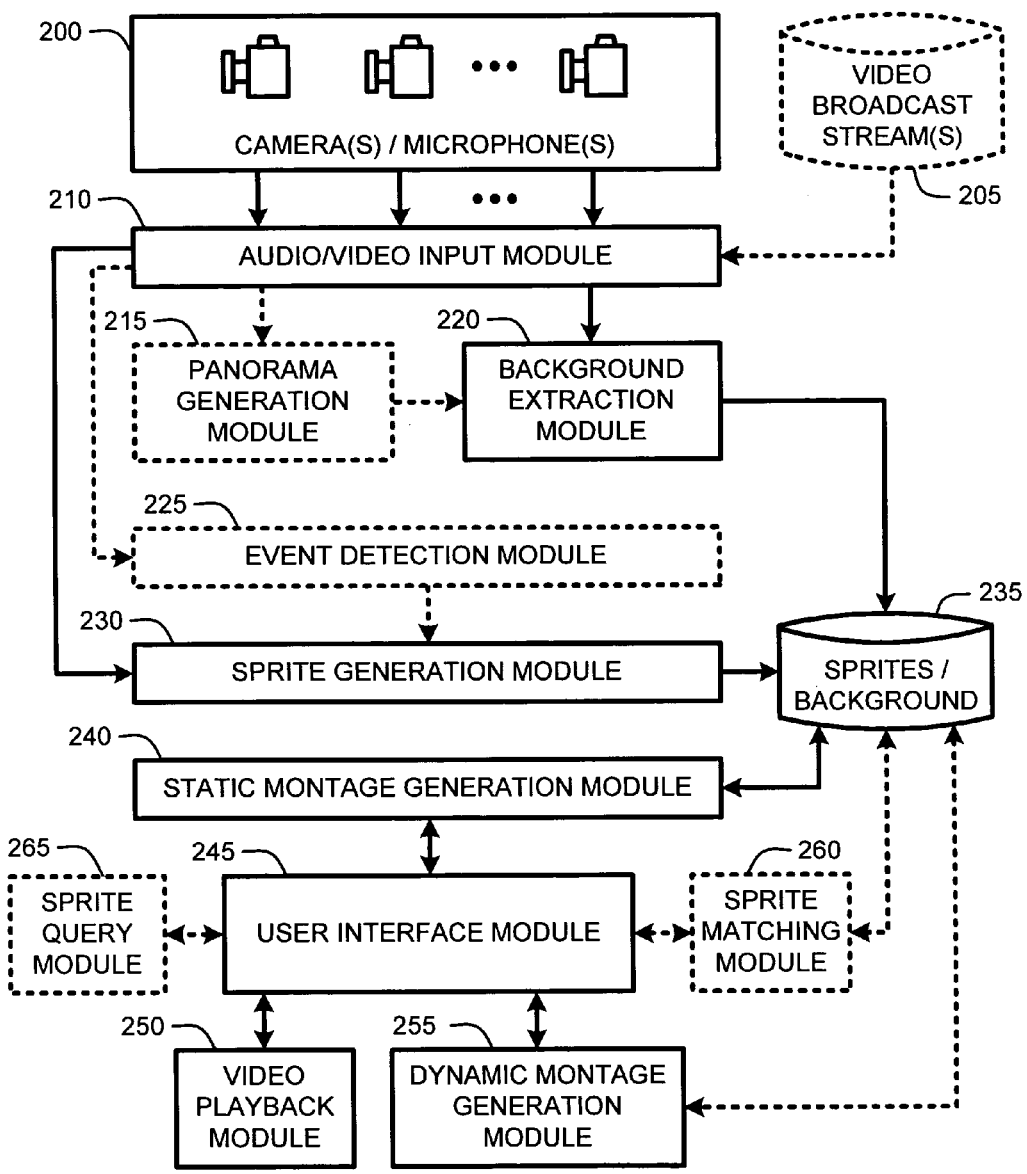
FIG. 2 illustrates an exemplary architectural system diagram showing exemplary program modules for implementing a Video Browser, as described herein.

2.2 System Architectural Overview:

The processes summarized above are illustrated by the general system diagram of FIG. 2. In particular, the system diagram of FIG. 2 illustrates the interrelationships between program modules for implementing the Video Browser, as described herein. It should be noted that any boxes and interconnections between boxes that are represented by broken or dashed lines in FIG. 2 represent alternate embodiments of the Video Browser described herein, and that any or all of these alternate embodiments, as described below, may be used in combination with other alternate embodiments that are described throughout this document.

In general, as illustrated by FIG. 2, the Video Browser begins operation by using one or more video cameras 200 (with microphones, if desired) to capture one or more video streams which are provided to an audio/video input module 210 via a conventional computer interface. Each video stream is then processed independently by the Video Browser, as described herein.

In another embodiment, rather than directly using one or more cameras 200 to provide input to the audio/video input module 210, one or more prerecorded video streams 205, such as, for example, a television or Internet broadcast video stream, or simply a prerecorded security tape, are instead provided to the audio/video input module 210.

Note that for purposes of explanation, the following discussion will assume the use of one camera 200 or video stream 205 as an input to the audio/video input module 210. However, as noted above, it should be understood that the Video Browser is fully capable of operating with multiple cameras or video streams.

In one embodiment, once the video stream (either prerecorded 205, or captured via camera 200) is received by the audio/video input module 210, it is provided to panorama generation module 215, depending upon the camera setup of multiple cameras, for generating a video panorama which covers a larger area then any of the individual cameras. Further, in the case of a panning camera 200, the input from single cameras is also used by the panorama generation module 215 to generate panoramas. It should be noted that generating a panorama video from one or more cameras 200 is a technique that is well known to those skilled in the art, and will not be described in detail herein.

Next, a background extraction module 220 is used to extract a common background image from either the panorama, or directly from the original video stream. This common background will later be used as the background image for the creation of both the static and dynamic montages, as described in further detail below. Extraction of a common background image from a video sequence is accomplished using any of a number of techniques, including background subtraction techniques, or by simply identifying an image frame in which there are no events of interest occurring. Further, the same technique identified below in Section 3.4 for generating flexible sprites is also capable of identifying a background layer of the video sequence. Regardless of how the background image is extracted, it is saved to a file or database 235. Note that methods for identification of a background image from a video sequence is well understood to those skilled in the art, and will not be described in detail herein.

In addition to processing the video stream to identify the common background image, in one embodiment, the video stream is also provided to an event detection module 225. In general, as described in further detail below, the event detection module 225 operates to identify indices of video frames constituting motion events. These motion events are identified by using the event detection module 225 to perform an initial low complexity pass of the video data. In the initial pass, the event detection module 225 looks for contiguous segments of the video stream where groups of pixels in the image undergo a coherent and rapid change from the background. Each of these video segments is then flagged as an "event data set" which is provided to a sprite generation module 230.

The sprite generation module 230 then individually processes each event data set to generate one or more corresponding video sprites for each data set, as described in further detail in Section 3.4. Note that as multiple events can occur as temporally overlapping or simultaneous events (such as two people walking in different locations of a set of video frames during overlapping times), there are cases where more than one video sprite will be generated from a particular event data set.

In an alternate embodiment, the sprite generation module 230 is capable of automatically identifying and extracting video sprites from the incoming data stream without first performing the aforementioned event detection process. In this case, each video sprite identified by the sprite generation module 230 will also correspond to an event of interest in the same manner as sprites generated from event data sets (which are merely subsets of the overall video stream). However, the use of detection rules is easier to implement when detecting events prior to sprite generation.

Each of the sprites extracted from the video stream (or event data sets) by the sprite generation module 230 is then saved to a file or database 235. Note that these sprites can be saved to the same file or database as the common background, or can be saved to a separate file or database. However, for purposes of explanation, FIG. 2 illustrates a common file for both the common background and the video sprites. Further, it should also be noted that each video sprite includes a frame index representing the video frames from which each of those video sprites was generated. These frame indices are then used as described below for directly accessing the specific portions of the video from which the particular video sprites were extracted.

Given the stored video sprites and the background image 235, the next step is to use a static montage generation module 240 to generate one or more static montages. In general, as described in further detail below in Section 3.3, the static montage is generated by using a constrained version of an NP-complete packing problem. In particular, the video sprites are arranged on the common background by placing each of the video sprites somewhere along their actual trajectory within the video sequence. As described in further detail below, a simple heuristic strategy is used to lay out the static montage by determining an optimal layout for each of the sprites on the common background, so as to minimize intersection or occlusion of the video sprites. However, it should be noted that partial occlusion of particular sprites by other sprites may be a valid solution to the layout problem. Further, in a related embodiment, scaling of the video sprites is used to better fit, or pack, the sprites onto the background image.

In yet another embodiment of this static montage, the static montage generation module also displays a time stamp or a frame number stamp adjacent to or overlapping each of the sprites displayed in the static montage. In this manner, the user is instantly alerted to not only a general position of any event that occurred during the period of time covered by the static montage, but also to the time that the event occurred.

This embodiment is particularly useful for allowing a user to immediately detect peaks of activity, or sprites that repeat at different times, such as the same car driving past on multiple occasions (with each occurrence being represented by different video sprites).

Further, while it is possible to generate a single static montage covering the entire period of the video, in the case where the video is very long, or where there are a very large number of video sprites, the static montage generation module 240 will instead generate a set of static montages that cover specific contiguous periods of the video, and thus the entire video in the aggregate. In this case, the static montages covering particular periods of time, such as, for example one-hour blocks of the video, are selectable via a user interface module 245, as described in further detail in Section 4 with respect to a discussion of a tested embodiment of the Video Browser. In addition, in a related embodiment, the time period of the video covered by these static montages is adjustable via the user interface module 245.

As noted above, the static montage (or montages) is interactive, such that user selection of particular sprites, via the user interface module 245, will cause playback of the frames of the video stream from which the selected sprite or sprites were generated. Playback of these selected portions of the video stream is accomplished using a video playback module 250 which uses conventional techniques to provide playback of the portion of the video stream corresponding to the frame index associated with any selected video sprite.

Further, in addition to providing a playback of all or part of the original video via sprite selection, a dynamic montage generation module 255 is used to animate one or more selected sprites relative to the common background. In this case, rather than packing sprites as described above for the creation of the static montage, the sprites will move about relative to the background along their original trajectory across the background. Further, in one embodiment, rather than providing a sequential playback of the video sprites, the selected video sprites are all played back concurrently. In addition, these dynamic video sprites are also user selectable, as with the video sprites displayed in static montage, such that user selection of one or more of the animated video sprites will also cause playback of the frames of the video stream from which the selected sprite or sprites were generated. Again, playback of these selected portions of the video stream is accomplished using the video playback module 250.

In this manner, video sprites occurring at different times throughout the video will be played at relatively the same time (depending upon the length of time that the events corresponding to the video sprites were visible in the original video), and may occlude each other as they move about across the common background. One advantage of this embodiment is that the user can see everything of interest that happened throughout the entire period of the video recording in an extremely short period of time by watching all of the selected sprites simultaneously. In fact, the temporal compression afforded by this embodiment can compress many hours of video into a very short period on the order of a few minutes or less, while still providing the user with an easily comprehensible overview of everything of interest that occurred during the entire period of the video.

In still other embodiments, more sophisticated analysis of the video sprites is provided via the user interface 245. For example, in one embodiment, a sprite matching module is used to automatically identify particular sprites that repeat during the course of the video recording. Sprite matching is easily accomplished because of the nature of the video sprites. In particular, using the sprite generation techniques described in Section 3.4, each sprite is a function its mean and variance of modeled appearance and appearance mask. These parameters can be directly compared to determine whether particular video sprites match, and therefore repeat, at different time during the period of the video recording. Alternately, conventional image matching techniques can also be used to determine whether particular sprites match, and thus repeat. Identified matching sprites are then displayed via any or all of the video playback, static montage, or dynamic montage.

In yet another embodiment, historical queries or sprite behavior can be used to identify particular events. For example, in one embodiment, a sprite query module 265 is provided via the user interface 245 to allow the user to enter particular queries. For example, the user can specify queries such as, for example, a time period of interest, an event type of interest, such as whether a particular sprite matches a generic model of a person or a car, an event location of interest, such as which events occurred in, originated from, or ended in particular locations or areas of the common background, whether particular events are "recurring events," such as, for example, the same van passing by on more than one occasion, or "unusual events" which include events or objects that have not been previously observed. Note that these are only a few general examples of historical queries that are possible via the sprite query module, and that the Video Browser described herein is not intended to be limited to these particular examples. Further, as with the sprite matching module 260, any sprites returned in response to the historical query are then displayed via any or all of the video playback, static montage, or dynamic montage.

Finally, it should also be clear that video sprites from different videos, such as from separate video recordings made on different days, can also be compared so as to identify recurring patterns corresponding to repeating sprites or repeating sprite motions or behaviors.

3.0 Operation Overview:

The above-described program modules are employed for implementing the Video Browser which operates to generate interactive sprite-based video montages for indexing and interacting with events of interest in video recordings. As summarized above, this Video Browser provides a system and method for capturing, recording, and processing a video stream to create interactive montages of video sprites which allow the user to quickly and fully visualize even very long videos. The following sections provide a detailed discussion of the operation of the Video Browser, and of exemplary methods for implementing the program modules described in Section 2 in view of the operational flow diagram of FIG. 7 which is presented following a detailed description of the operational elements of the Video Browser.

3.1 Operational Details of the Video Browser:

The following paragraphs detail specific operational embodiments of the Video Browser described herein. In particular, the following paragraphs describe sources and types of video recordings or streams for use with the Video Browser; generation of both static and dynamic sprite montages; and generation of flexible sprites from the video stream.

3.2 Physical Cameras and Video Streams:

As noted above, any of a number of conventional camera types or video feeds may be used in combination with the Video Browser. In fact, virtually any video camera or video stream feed which is capable of being interfaced with a computer, and by extension to the Video Browser, may be used. Further, the easy availability of relatively inexpensive and high resolution video cameras is an important factor in the portability of the Video Browser. For example, newer video cameras can typically be connected directly to a computer's existing ports (USB interfaces, IEEE 1394 interfaces, Bluetooth™ wireless interfaces, IEEE 802.11 wireless interfaces, etc). Any such camera can be used by the Video Browser. Similarly, video feeds from television broadcasts, network or Internet broadcasts, web cam video feeds, or from satellite-based video imaging devices are also fully compatible with the Video Browser described herein.

Figure 3:
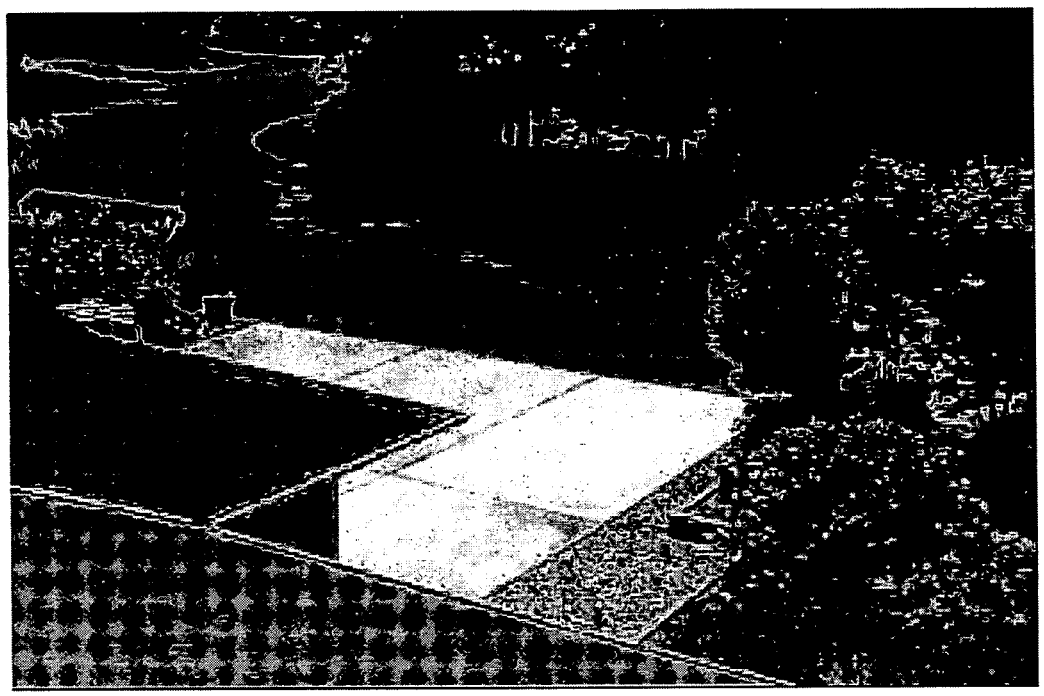
FIG. 3 provides an example of a typical background scene extracted from a video camera used to provide video input to the Video Browser, as described herein.

3.3 Generating Static and Dynamic Montages of Sprites:

As described in further detail below, both the static and dynamic montages of sprites are generated using the same sprites and the same common background. In addition, the sprites in both the static and dynamic montages are user selectable. The primary difference between the static and dynamic montages is that the static montage places static copies of the sprites into automatically determined fixed positions on the common background when generating the static montage. (See an example of a background image for a home security camera in FIG. 3). In contrast, the dynamic montage includes animated versions of the same sprites. In other words, the sprites in the dynamic montages are the same as those used in constructing the static montages, except that the dynamic sprites, rather than being stationary, follow the general trajectory and motions of their video counterparts in the original video frames from which those sprites were generated while they are displayed on either a background image or actual frames of the original video.

3.3.1 Detecting and Segmenting Events:

As noted above, one method for initiating sprite generation is to first determine the location of specific events within the video stream that meet particular criteria, including, for example, particular types of motion events, video change thresholds, event location within the video frame, etc. Video frames corresponding to these detected events are then used to identify the aforementioned "event data sets." One advantage of detecting such events prior to generating the sprites is that it can serve to limit the generation of sprites that might not otherwise be of interest. However, it should also be noted that this detection of motion events does not need to be used for the purpose of actually limiting sprite generation. Again, these motion events are used to provide event data sets which are then used to generate the video sprites corresponding to each motion event data set.

Specifically, the sprite generation techniques described below in Section 3.4 is fully capable of automatically extracting almost any detected motion related event, and generating a video sprite for that motion event. However, as noted above, it may be desired to limit those sprites to some degree. For example, while the sprite generation techniques described below are capable of generating sprites for small objects such as squirrels, birds, or other small animals, there may be no interest in such motion events, especially in the case of security videos. Further, there may be a particular interest in events that occur in particular regions of a video stream, such as, for example, just outside a secure fenced area, rather than having an interest in events inside the fenced area. Therefore, detection rules, such as size, color, or regional constraints on the event detection are useful ways to limit sprite generation to particular sizes, colors, locations, etc. of events, which in turn are used to generate the video sprites.

In any case, the general method of event detection employed by the Video Browser operates to determine a set of initial clips or sequences of video frames in the video stream that constitute the motion events. Specifically, to obtain the indices of frames constituting the motion events, an initial low complexity pass of the video data is first performed. In this pass, the Video Browser looks for segments of the video where groups of pixels in the image undergo a coherent and rapid change from the background. Further, this detection can be limited by particular detection rules, including, for example, size, position, color, event duration, etc. In addition, as a part of the initial low complexity pass, a background model of the scene captured by the video stream is constructed and adaptively updated over time to account for more slowly occurring lighting changes and alterations of camera position.

Algorithmically, the event detection method employed by the Video Browser uses conventional motion detection techniques. Such methods typically provide for real-time segmentation of moving regions in image sequences by using background subtraction or thresholding of an error between an estimate of the scene background without moving objects and the current image frame.

For example, one such technique adaptively models each pixel of an image frame as a mixture of Gaussians, and then uses an on-line approximation to update the mixture model. The Gaussian distributions of the adaptive mixture model are then evaluated to determine which are most likely to result from a background process. Each pixel is then classified based on whether the Gaussian distribution which represents it most effectively is considered part of the background model, or whether those pixels are not a part of the background. Given this determination of whether particular pixels are a part of the background or not, the Video Browser then applies conventional morphological opening and closing operations to isolated connected "blobs" of pixels. The Video Browser then identifies video frames corresponding to these individual connected blobs of pixels as separate "motion event data sets" when a fraction of those pixels in the image frames are different from a predetermined threshold. Once the video stream has been processed to identify the motion event data sets, these motion event data sets are then used as the basis for generating the video sprites as described in further detail in Section 3.4.

3.3.2 Static Montages:

The basic idea behind the creation of the static montage is to provide the user with a summary of the relevant events that have occurred during the course of the video recording. In general, the generation of the static montage of sprites is treated as constrained packing problem. In particular, this problem can best be described as determining a best arrangement of video sprites on the common background given a particular number and size of video sprites, and a fixed background image size on which to place those video sprites.

Packing problems are well studied and are known to be NP-complete. Laying out the video sprites on the common background is basically a constrained version of a packing problem as it is desired that the video sprites lie somewhere along their actual trajectory in the video sequence. One simple method for addressing this constrained packing problem is to lay out the static montage onto the common background by iteratively determining an optimal layout of the sprites.

In particular, the video sprite models for each event include associated trajectory information. In other words, as part of generating the video sprites for each event, the path of those video sprites through the video sequence is also determined. Therefore, the first step in determining an optimal layout of the video sprites on the common background is to simply initialize the sprite of the first event to the position that the corresponding pixels of the corresponding event occupied at approximately the middle frame of that event. In other words, if the event lasted 20 frames, then the initial position of the video sprite would correspond to the location of the event in frame 10 of the event. The Video Browser then proceeds chronologically through the events, initializing each video sprite to its middle position. If the current sprite overlaps with another previously positioned sprite, then either the current sprite or the previously positioned sprite is simply adjusted forward or backwards along its inferred trajectory until the overlap is resolved.

If the conflict cannot be resolved by shifting sprites along their trajectory, there are several additional options that can be applied. In particular, the sprites can simply be allowed to overlap, so long as there is a sufficient amount of each sprite visible so that the user will be able to visually distinguish the individual sprites. For example, as illustrated by the example static sprite montage of FIG. 4, many of the sprites (mostly cars and people in this case) are at least partially overlapping. For example, sprite 400 represents a person walking in the driveway of the house represented in the foreground at 2:04 pm. Similarly, sprite 410 represents a white minivan-type vehicle driving past the house represented in the foreground at 2:46 pm. Alternately, the sprites can be scaled to make them small enough to fit, again keeping the sprites approximately along their original trajectory.

In the case of sprite overlap, in cases a planar-perspective model can be assumed, and a z-buffer or depth value for inferred sprites using a simple heuristic/algorithm. Specifically, when it is desired to allow sprites to overlap, the vertical location of the bottom of the sprite is used as an index into a z-buffer. In other words, for a typical camera view, such as the view represented by the background image FIG. 3, or the corresponding static sprite montage of FIG. 4, locations higher in the two-dimensional image tend to represent positions farther away from the camera. Using this information as a simple z-buffer index for the sprites tends to produce natural looking sprite placements, as can be seen by the placement of the sprites representing the cars in FIG. 4 and FIG. 5 that were detected as events in the video stream. For example, as illustrated by sprites 520 and 525 in FIG. 5, sprite 520 partially overlaps the lower portion of sprite 525 (which in this case is the same car passing in different directions at closely spaced times, 3:07 pm and 3:09 pm, respectively).

In yet another embodiment, rather than trying to fit every single sprite into a single image, a new background panel is initialized, and the current and subsequent sprites are placed in their middle positions in the new background window. Additional background panels are then initialized as needed. In a related embodiment, background panels are limited to particular fixed or user-adjustable time spans, such as, for example, one-hour windows. In this case, the sprites for the first hour of the video stream are placed into the first background panel (with additional panels being initialized if needed), and the sprites for the second hour are placed into a subsequent background panel (again, with additional panels being initialized if needed).

Figure 5:
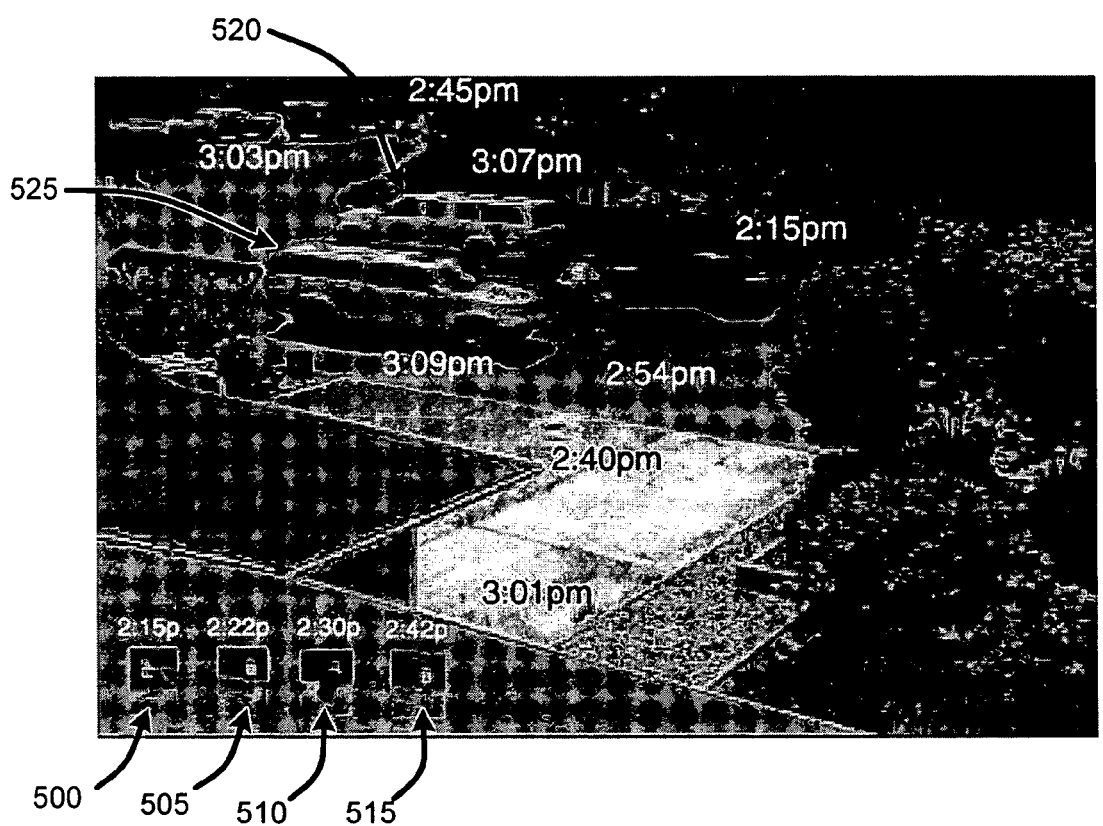
FIG. 5 provides an example of a typical static video montage showing events as video sprites overlaid on the background of FIG. 3, with optional time stamps for each video sprite, and optional sprite thumbnails, as described herein.

In yet another embodiment, the problem of higher activity density regions is addressed by including at least some of the video sprites within small thumbnails or "overflow icons" in some small portion of the static montage. For example, as Illustrated in FIG. 5, there are four such thumbnails 500, 505, 510, and 515, in the lower left corner of the static montage. Further, as with the other sprites placed within the static montage, the thumbnails are user selectable. Consequently, user selection of any one or more of the thumbnails causes either or both playback of the video associated with the corresponding sprites, or a dynamic animation of those sprites within the dynamic sprite montage.

Figure 4:
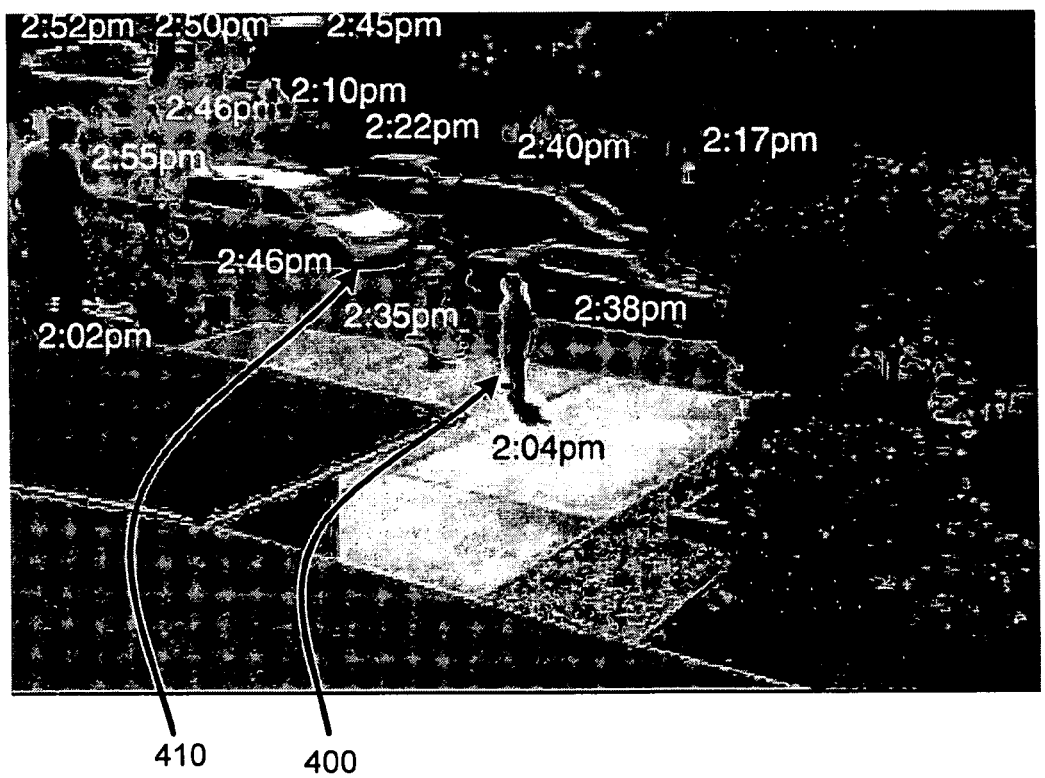
FIG. 4 provides an example of a typical static video montage showing events as video sprites overlaid on the background of FIG. 3, with optional time stamps for each video sprite, as described herein.

Finally, as illustrated by both FIGS. 4 and 5, in one embodiment, the time associated with the current position of each displayed sprite is included adjacent to that sprite. Consequently, the user is able to immediately to determine when any particular event occurred without the need to further examine any frame indices or time stamps associated with the individual sprites. This information can be extremely useful especially in the case of security videos. For example, is illustrated in FIG. 5, it can be seen that a white SUV-type vehicle, represented by sprites 520 and 525, appears to have passed in both directions past the house in the foreground of the common background image, first at 3:07 pm, then in the opposite direction at 3:09 pm.

3.3.3 Dynamic Montage:

As with the static montage, the animated sprites of the dynamic montage are user selectable. As noted above, these sprites then act as an index into the original video for initiating playback of the portions of the video associated with the selected sprite. In particular, in creating the dynamic montage, the Video Browser "sprite masks" corresponding to each animated sprite, such that user selection of any portion of the animated dynamic montage having a sprite serves to select a corresponding mask overlaying the video playback of the dynamic montage. As these masks correspond to particular sprites, selection of the masks serves to map user selection (such as via a user mouse click) to the location of the start of the associated event in the original video.

The task of constructing a video montage of sprites (i.e., the "dynamic montage") is similar to the task of constructing a static montage of flexible sprites. However, in this case, the Video Browser must optimize the placement of sprites within a 3D volume of pixels (x, y, and time) so as to minimize overlapping pixels of the sprites as they move about the background. In general, to create dynamic montages a heuristic procedure similar to the procedure used to create the static montage is employed. However, in addition to moving the sprites along their trajectory the playback start time of the animated sprites can also be adjusted so as to avoid or minimize sprite overlap. Further, as with the dynamic montage, one or more of the sprites can also be scaled so as to minimize overlap of the sprites in the dynamic montage.

For example, all of the sprites (or only a subset of selected sprites) can be played back beginning at the same time in the dynamic montage. However, this simple procedure might result in significant sprite overlap. Alternately, in one embodiment, rather than playing each of the sprites back beginning at the same time, the sprites are played back sequentially. In other words, as soon as one animated sprite finishes playing back in the dynamic montage, the next sprite begins playback. However, the sequential nature of this embodiment tends to take longer to convey the event information to the user. In another related embodiment, the start times of the sprite playbacks in the dynamic montage are concurrent, but automatically staggered or adjusted, as necessary, so as to minimize sprite overlap. Implementing this embodiment is accomplished by simply examining the trajectory of each sprite and ensuring that any sprites having overlapping trajectories are played back at sufficiently offset times in the dynamic montage so as to minimize or eliminate the overlap.

3.4 Generation of Flexible Sprites:

Automatic modeling and analysis of video images using a layered representation has been addressed by several conventional schemes. In general, the basic idea is to isolate or identify a particular object or objects within a sequence of images, then to decompose that video sequence into a number of layers, with each layer representing either an object or a background image over the entire video sequence. Such layered objects are commonly referred to as "sprites." The Video Browser described herein makes use of such conventional techniques for generation of video sprites from the recorded video stream.

In the context of the Video Browser described herein, these conventional sprite generation techniques are applied to the aforementioned motion event "data sets" rather than to the entire video stream as a whole. In other words, each motion event data set is decomposed into a set of one or more sprites layered on top of a background. The sprites from one or more of the motion event data sets are then composited as described above to generate the aforementioned montages. However, as noted above, this sprite generation technique can also be applied to the entire video, or any desired segment of the video, for automatic generation of sprites without first identifying the event data sets.

One example of a conventional sprite generation technique is described in U.S. Patent Application Publication No. US 2004/0095374, entitled "A SYSTEM AND METHOD FOR AUTOMATICALLY LEARNING FLEXIBLE SPRITES IN VIDEO LAYERS," by Nebojsa Jojic and Brendan Frey, the subject matter of which is incorporated herein by this reference. This U.S. Patent Application Publication, No. US 2004/0095374, describes a simple and efficient way to model and automatically analyze video or image sequences through the use of a layered representation in which a 3-dimensional scene is decomposed into a set of 2-dimensional objects in layers i.e., "sprites," thereby significantly simplifying the geometry of the scene. Such systems are often referred to as 2.5-dimensional or simply 2.5-D sprite modeling systems.

In general, the referenced sprite generation system uses a probabilistic "generative model" for learning the appearances of multiple objects in multiple layers (i.e., "flexible sprites"), over an entire video or image sequence. The generative model is capable of learning sprites of any size, shape, or geometry without the use of sprite-specific shape priors or models. Further, the generative model allows the sprites to move and deform, and even to occlude each other from frame to frame in an image sequence. Learning flexible sprites from an image sequence involves automatically decomposing a video sequence for learning probabilistic 2-dimensional appearance maps and masks of moving occluding objects in the video sequence. This decomposition is accomplished by using a variational expectation maximization algorithm to learn a mixture of sprites from the image sequence.

Specifically, for each input image, probabilistic inference is used to infer sprite class, translation, and mask values and pixel intensities (including obstructed pixels) in each layer. Exact inference is intractable; however, the referenced generative model uses a variational inference technique to efficiently process images. Visual data for modeling the flexible sprites within the image sequence is generated where parameters such as appearance bit maps and noise, shape bit-maps and variability in shape, etc., are known. Further, when unknown, these parameters are reliably estimated from visual data by the generative model without prior pre-processing by using a maximization algorithm. Consequently, the system described in the referenced U.S. Patent Application, Publication No. US 2004/0095374, is ideally suited for learning the video sprites used to represent the unique events corresponding to each motion event data set.

Figure 6:
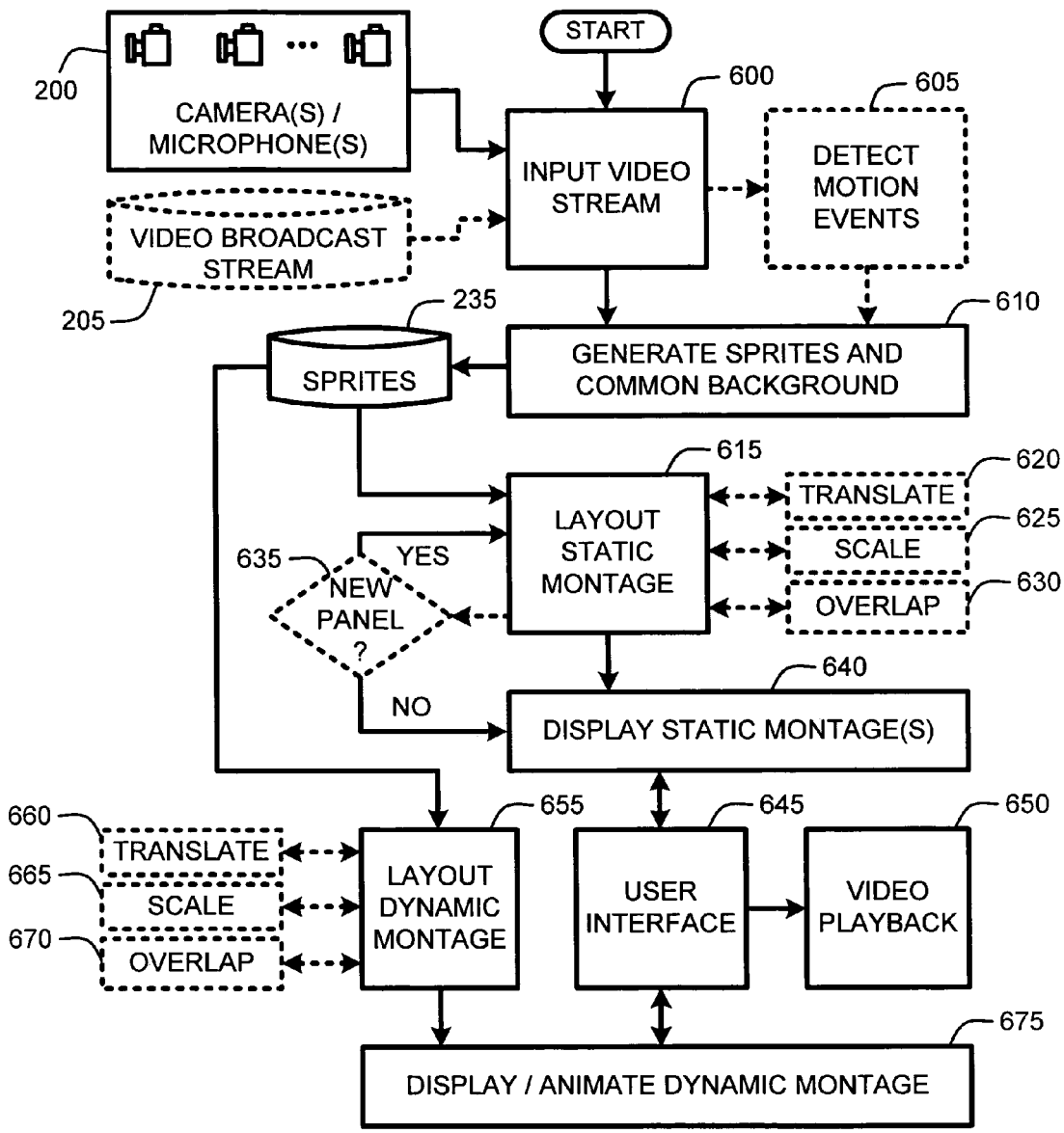
FIG. 6 provides an exemplary operational flow diagram which illustrates operational flow of the Video Browser, as described herein.

4.0 Video Browser Operation:

The processes described above with respect to FIG. 2 and in view of the detailed description provided above in Section 3 are summarized by the general operational flow diagram of FIG. 6, which illustrates an exemplary operational flow diagram showing one generic embodiment of the Video Browser. Following the discussion of the operational flow diagram of FIG. 6, a tested embodiment of the Video Browser is described with respect to the FIG. 7 and FIG. 8. It should be noted that any boxes and interconnections between boxes that are represented by broken or dashed lines in FIG. 6 represent alternate embodiments of the Video Browser described herein, and that any or all of these alternate embodiments, as described below, may be used in combination with other alternate embodiments that are described throughout this document.

In particular, as illustrated by FIG. 6, the Video Browser described herein begins operation by first receiving an input video stream 600 from one or more video cameras 200 or a video broadcast stream 205, such as, for example, a television or Internet broadcast video stream, or simply a prerecorded security tape. Regardless of the source, once the video stream has been input 600, the video stream is optionally pre-processed to detect motion events 605 within the video stream. These video frames associated with these detected motion events are then referred to as "event data sets" as described above.

Next, the Video Browser generates video sprites 610, either from the entire video, or from subsets of the video represented by the aforementioned event data sets. In addition, the common background is also extracted from the video stream at this time. Once the video sprites and background have been generated 610 the sprites and background are stored to the file or database 235. As noted above, each of the video sprites includes information or metadata indicating the video frames from which each particular sprite was generated. In addition, in the case that there is time information associated with the video frames, each of the sprites will also include the time that the video corresponding to the sprite occurred as a detected motion event. It should be noted that these times can be indicated as sprite start times, average sprite appearance times, sprite duration within the video stream, etc.

Once the sprites and background have been generated 610 and stored 235, for later use, the next step is to determine a layout 615 for the static sprite montage. As discussed above, the basic idea behind the creation of the static montage is to provide the user with a summary of the relevant events that have occurred during the course of the video recording. In general, in determining the layout of the static montage, static copies of each of the sprites are positioned on one or more copies of the common background, either as full sprites, or as thumbnail representations. Positioning the sprites is accomplished in the simplest embodiment by simply placing each sprite at its approximate middle position, beginning with the earliest occurring sprite and proceeding sequentially to the last occurring sprite in the video sequence. Further, in additional embodiments, as described above, this positioning can also be accomplished using any combination of sprite translations 620, sprite scalings 625, and sprite overlap 630.

In addition, as noted above, in one embodiment, the sprites are laid out on more than one common background image panel, either as a function of overall time periods of each panel, or as a function of the number of video sprites, so as to prevent overcrowding of the video sprites. Consequently, in one embodiment as each panel is being laid out, a determination is made 635 as to whether a new panel is to be initialized. If so, then the layout 615 current panel is finalized, and the layout of the next panel next panel is accomplished using the exact same process as that used to lay out the preceding panels, except that the first sprite for the immediately subsequent panel will be the next occurring sprite after the last sprite in the immediately preceding panel.

Once the layouts 615 of all of the static montages have been determined, the static montages are displayed 640 to the user via a conventional computer display device for user interaction via a user interface 645. As noted above, the static montages are interactive, such that user selection of particular sprites, via the user interface 645, will cause playback 650 of the frames of the video stream from which the selected sprite or sprites were generated.

Further, in addition to providing a playback of all or part of the original video via sprite selection, layout 655 for the dynamic sprite montage is also determined at this time. As with the static montages, in alternate embodiments, layout 655 of the dynamic montage includes any desired combination of translations 660, scalings 665, and overlap 670. However, unlike the layout 615 of the static montages, layout 655 of the dynamic montage must also consider the position of each sprite with respect to time, as each sprite moves about during the display and animation 675 of the dynamic montage. Consequently, the translations 660, in this case are temporal, such that the start time of the animation 675 of each sprite within the dynamic montage is shifted or translated so as to eliminate or minimize overlap of the sprites during the animation.

Further, as noted above, in one embodiment, all of the video sprites are included in the layout 655 of the dynamic montage. However, in additional embodiments, additional dynamic montages are produced based on the same criteria as that used for creating the static montages. In fact, in one embodiment, each of the dynamic montages will correspond to one of the static montages, such that user selection of any static montage will display and animate 675 the corresponding dynamic montage. In addition, as with the static montages, user selection of any of the sprites in the animated dynamic montage will initiate playback of the section of the video from which the selected sprite was generated.

Figure 7:
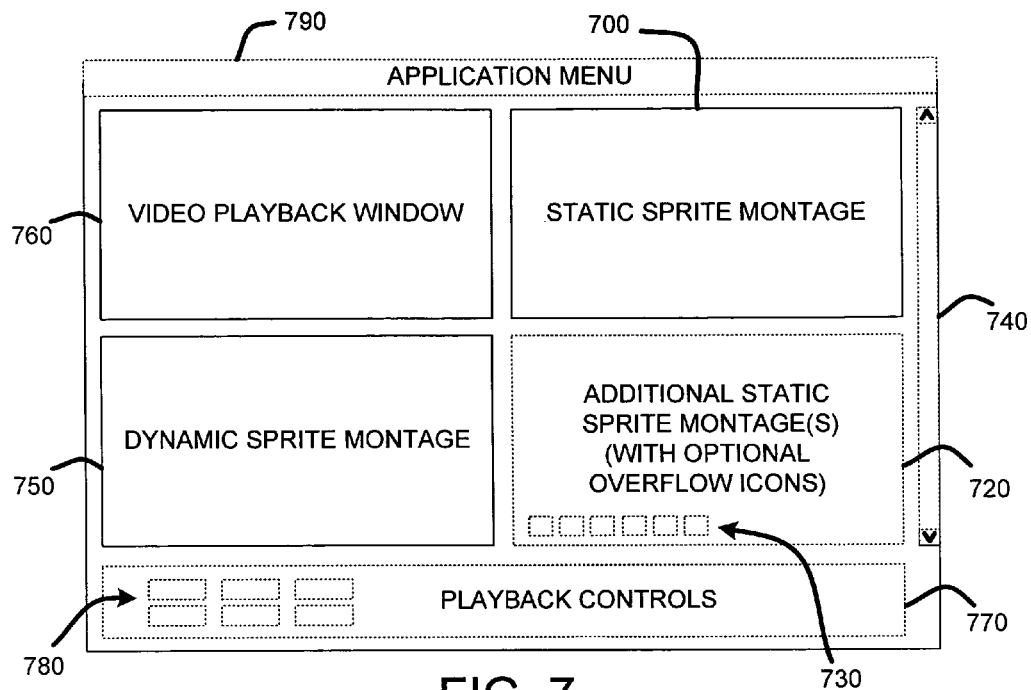
FIG. 7 is an exemplary layout of a user interface showing one possible arrangement of static sprite montages, a dynamic sprite montage, a video playback window, and a set of playback controls, for implementing the Video Browser, as described herein.

4.1 Exemplary Video Browser User Interface:

FIG. 7 is an exemplary layout of a user interface showing one possible arrangement of static sprite montages, a dynamic sprite montage, a video playback window, and a set of playback controls, for implementing the Video Browser, as described herein. It should be noted that any boxes and interconnections between boxes that are represented by broken or dashed lines in FIG. 6 represent alternate embodiments of the Video Browser described herein, and that any or all of these alternate embodiments, as described below, may be used in combination with other alternate embodiments that are described throughout this document.

In particular, FIG. 7 illustrates a user interface layout in one possible embodiment of the Video Browser wherein a plurality of static montage windows 700 and 720 are provided for user interaction. In addition, the lower static sprite montage window 720 also includes overflow sprite icons or thumbnails 730 as described above. Further, a conventional slider control 740 is provided to allow the user to scroll through additional static montage windows (not shown).

A single dynamic sprite montage window 750 is provided for presenting sprite animations for either user selected sprites (from one or more of the static montages), sprite animations of all sprites corresponding to one or more user selected static montage windows (700 or 720), or animation of all sprites generated from the video stream. Control over the animation of the sprites in the dynamic sprite montage begins as soon as one or more sprites (or static montages) are selected.

Further, a set of playback controls 770 provides individual controls 780 that allow the user to start, stop, pause, loop, slow, speedup, etc., the playback of the animated dynamic sprite montage. In addition, in one embodiment, these controls also provide the user with the capability to select particular segments of the video stream for populating the static montages, the capability to display or hide times associated with each displayed sprite, or to display or hide a frame index associated with each displayed sprite. Clearly, other controls may be added as desired, such as, for example, controls for printing, importing or exporting individual sprites. In additional embodiments, similar controls are provided for printing, importing, exporting, etc., any of the dynamic montages or the video stream itself.

In addition, a video playback window 760 is also provided for presenting playback of portions of the video stream corresponding to user selected sprites. It should be noted that the entire video stream, or any desired portion of the video stream, can also be presented in the video playback window 760. As with the playback of the animated dynamic sprite montage, the set of playback controls 770 also allows the user to start, stop, pause, loop, slow, speedup, etc., the playback of the video stream, or the selected portions thereof, via user selection of the various individual controls 780.

Finally, an application menu 790 is provided to allow the user access to some of the more complicated sprite analyses. For example, as noted above, in one embodiment, the user is presented with the capability to query the set of sprites to identify sprites occurring at particular times, sprites that repeat or match within particular periods of time or during the duration of the video stream, sprites originating from particular regions of the video stream, etc. In this embodiment, sprites returned by the user query are used to populate one or more dedicated static montages, along with one or more dynamic montages. The static and dynamic montages resulting from the user query are then addressed and accessed in exactly the same manner as the static and dynamic montages described above.

Figure 8:
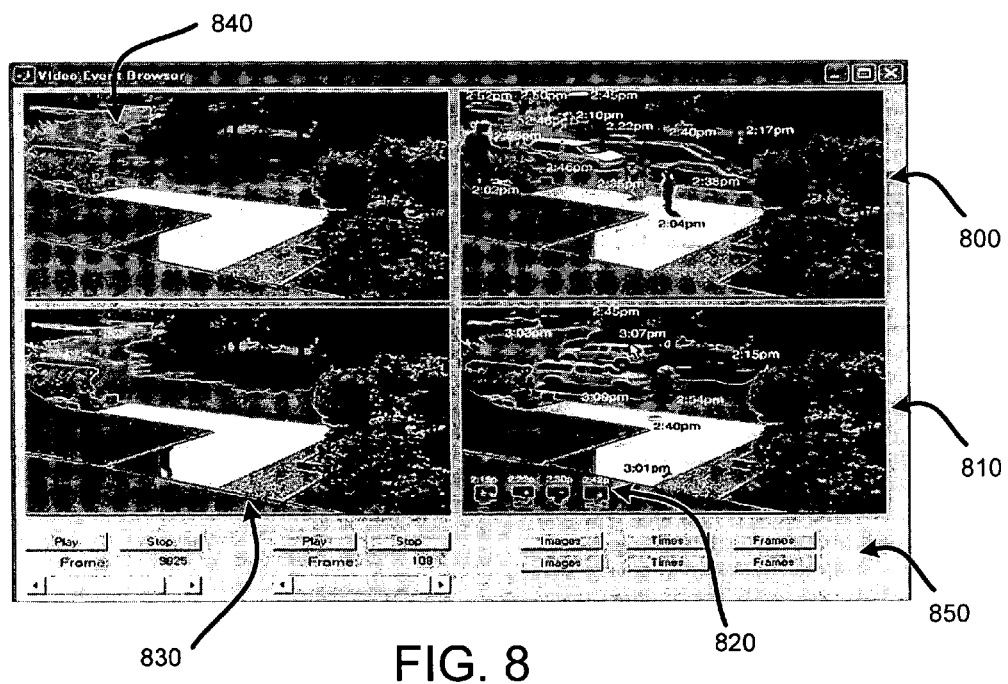
FIG. 8 illustrates a tested embodiment of the user interface of FIG. 7, as described herein.

FIG. 8 illustrates a tested embodiment of the user interface of FIG. 7, as described herein. In particular, as can be seen by the screen print of the Video Browser represented by FIG. 8, this tested embodiment of the Video Browser includes two static montages windows 800 and 810. In addition, the second static montage also includes a set of sprite thumbnails 820, as described above. Both static sprite montages 800 and 810 include a time stamp for each of the displayed sprites and for each of the displayed sprite thumbnails 820 in the second sprite montage 810.

A dynamic sprite montage window 830 is provided in the lower left corner of the tested user interface. Note that no sprites are currently displayed in the dynamic sprite montage, since no playback or animation of the dynamic sprite montage has yet been initiated by selection of particular sprites or static sprite montages. In this case, rather than simply illustrating a blank window for the dynamic montage 830, the common background that is used for both the static and dynamic sprite montages 800, 810, and 830 is instead displayed.

In addition, a video playback window 840 is provided in the upper left window of the tested user interface. As with the dynamic montage window 830, in this tested embodiment, at any time that a video playback is not occurring, a copy of the common background that is used for both the static and dynamic sprite montages 800, 810, and 830, is instead displayed in the video playback window 840.

Finally, a set of playback controls 850 is provided for interacting with Video Browser in the manner described above. As described above, this set of controls 850 in the tested embodiment of the Video Browser includes controls for displaying time or frame stamps along with the video sprites, playing an stopping playback of the video or the dynamic montage, and slider bars for indicating and manually selecting a playback position of the video playback window 840, and dynamic montage window 830. Furthermore, it should be clear in view of the preceding discussion that the Video Browser described herein is not intended to be limited to the controls illustrated FIG. 8, and that any controls described or implied above may be included in a working embodiment of the Video Browser described herein.

The foregoing description of the Video Browser has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the Video Browser. It is intended that the scope of the invention be limited not by this detailed description, but rather by the claims appended hereto.

What is claimed is:

1. A system for viewing and interacting with video sprites generated from a video stream, comprising:
   a device for receiving a video stream,
   a device for processing the video stream to generate a set of one or more video sprites, with each video sprite corresponding to a separate unique event detected in the video stream;
   a device for extracting a common background image from the video stream;
   a device for generating at least one static sprite montage of the video sprites by arranging one or more of the video sprites in fixed positions on a copy of the common background image to create each static sprite montage;
   a device for generating at least one dynamic sprite montage by creating an animation of one or more of the video sprites in each static sprite montage against a copy of the common background image;
   a device for displaying one or more of the static sprite montages in an interactive user interface; and
   a device for displaying one or more of dynamic sprite montages in the interactive user interface.

2. The system of claim 1 wherein the interactive user interface further includes a video playback window for playing at least a portion of the video stream.

3. The system of claim 2 wherein each of the sprites within the at least one static sprite montage are user selectable via the user interface, and wherein user selection of any of the sprites initiates a playback of a segment of the video stream in the video playback window corresponding to image frames of the video stream from which the selected sprite was generated.

4. The system of claim 2 wherein each of the sprites within the at least one dynamic sprite montage are user selectable via the user interface, and wherein user selection of any of the sprites initiates a playback of a segment of the video stream in the video playback window corresponding to image frames of the video stream from which the selected sprite was generated.

5. The system of claim 1 wherein generating at least one dynamic sprite montage further comprises automatically populating the at least one dynamic sprite montage with video sprites corresponding to video sprites selected from the at least one static sprite montage via the user interface.

6. The system of claim 1 wherein generating at least one dynamic sprite montage further comprises automatically populating the at least one dynamic sprite montage with video sprites corresponding to video sprites generated from a predetermined segment of the video stream.

7. The system of claim 1 wherein generating at least one dynamic sprite montage further comprises automatically populating the at least one dynamic sprite montage with all of the video sprites used to generate the at least one static sprite montage.

8. The system of claim 1 further comprising including a visible time stamp in close proximity to each of the sprites within the at least one static sprite montage, and wherein the visible time stamp corresponds to a time that the corresponding unique event was detected in the video stream.

9. The system of claim 1 further comprising including a visible time stamp in close proximity to each of the sprites within the at least one dynamic sprite montage, and wherein the visible time stamp corresponds to a time that the corresponding unique event was detected in the video stream.

10. The system of claim 1 wherein the interactive user interface provide a control for processing user queries relating to the video sprites generated from the video stream.

11. The system of claim 10 wherein the user queries include sprite matching queries.

12. The system of claim 10 wherein the user queries include sprite positional queries with respect to a location within one or more video frames of the video stream wherein corresponding unique events were detected in the video stream.

13. The system of claim 10 wherein the user queries include a sprite observation time window, wherein sprite observation times correspond to a time wherein corresponding unique events were detected in the video stream.

14. The system of claim 1 wherein extracting the common background image from the video stream comprises automatically constructing a panoramic image from one or more frames of the video stream.

15. The system of claim 1 wherein generating at least one static sprite montage further includes populating one or more of the static sprite montages with one or more user selectable sprite thumbnails.

16. The system of claim 1 wherein arranging one or more of the video sprites in fixed positions on a copy of the common background image to create each static sprite montage comprises adjusting a position of one or more of the sprites along a computed trajectory of each sprite so as to minimize potential sprite overlap within the static sprite montage.

17. The system of claim 1 wherein creating an animation of one or more of the video sprites on a copy of the common background image for generating the at least one dynamic sprite montage further comprises staggering an individual start time for the animation of each individual sprite in the animation so as to minimize potential sprite overlap within the dynamic sprite montage during animation of the dynamic sprite montage.

18. The system of claim 1 wherein generating at least one static sprite montage further includes allowing sets of one or more of the sprites to at least partially overlap in accordance with an estimated z-buffer index computed for each video sprite.

19. The system of claim 1 wherein creating an animation of one or more of the video sprites a copy of the common background for generating the at least one dynamic sprite montage further includes allowing sets of one or more of the sprites to at least partially overlap at one or more times during animation of the dynamic sprite montage in accordance with an estimated z-buffer index computed for each video sprite.

20. A computing device having a user interface for interacting with a prerecorded video stream, comprising:
   providing at least one window within a user interface containing an automatically generated static representation of user selectable video sprites generated from a video stream against a background image extracted from the video stream;

providing at least one window within the user interface containing an automatically generated animated representation of one or more of the user selectable video sprites against the background image; and providing at least one video playback window within the user interface for presenting segments of the video stream corresponding to user selected video sprites.

21. The computing device of claim 20 wherein generating video sprites from the video stream comprises automatically generating at least one unique video sprite corresponding to each of a plurality of automatically detected motion events observed within the video stream.

22. The computing device of claim 20 wherein automatically generating the static representation of user selectable video sprites comprises arranging one or more of the video sprites in fixed positions on the background image, and wherein possible overlap between two or more of the video sprites is minimized by shifting one or more of the video sprites along a computed trajectory line corresponding to each video sprite.

23. The computing device of claim 22 wherein the possible overlap between video sprites is further minimized by scaling one or more of the video sprites to further reduce video sprite overlap.

24. The computing device of claim 22 wherein any overlap between video sprites is managed by overlapping the video sprites in accordance with an estimated z-buffer index computed for each video sprite.

25. The computing device of claim 20 wherein a visible time stamp is included in close proximity to each of the video sprites within any of the at least one static representation of user selectable video sprites and the at least one animated representation of one or more of the user selectable video sprites.

26. The computing device of claim 20 wherein the user interface further includes a query control for processing user queries relating to the video sprites generated from the video stream, and wherein said queries include any of sprite matching queries, sprite positional queries, and sprite observation time queries.

27. The computing device of claim 20 wherein automatically generating the animated representation of one or more of the user selectable video sprites further comprises staggering an individual start time for the animation of each individual sprite in the animation so as to minimize potential sprite overlap within the animation.

28. The computing device of claim 27 wherein sprite overlap during animation of the dynamic sprite montage is managed in accordance with an estimated z-buffer index computed for each video sprite.

29. A computer-readable storage medium not including a modulated data signal having computer executable instructions for providing a user interface for interacting with a video stream, said computer executable instructions comprising:

recording a video of a scene using at least one camera, processing the video to detect one or more unique events occurring within the video, and designating video frames corresponding to each detected event as an event data set;

processing each event data set to generate a set of one or more video sprites, with each video sprite corresponding to unique events represented by each corresponding event data set;

extracting a common background image from the video;

generating at least one static sprite montage of the video sprites by arranging one or more of the video sprites in fixed positions on a copy of the common background image to create each static sprite montage, and wherein each of the video sprites is user selectable;

generating at least one dynamic sprite montage by creating an animation of one or more of the video sprites from one or more of the static sprite montages against a copy of the common background image, and wherein each of the animated video sprites is user selectable;

displaying one or more of the static sprite montages in an interactive user interface;

displaying one or more of dynamic sprite montages in the interactive user interface; and providing a video playback window in the interactive user interface for providing a playback of at least a portion of the video stream corresponding to video frames associated with the event data set corresponding to any user selected video sprites.

30. The computer-readable storage medium of claim 29 wherein generating at least one dynamic sprite montage further comprises automatically populating the at least one dynamic sprite montage with video sprites corresponding to video sprites selected from the at least one static sprite montage via the user interface.

31. The computer-readable storage medium of claim 29 further comprising including a visible time stamp in close proximity to each of the video sprites within any of the at least one static sprite montage and the at least one dynamic sprite montage.

32. The computer-readable storage medium of claim 29 further comprising including a visible time stamp in close proximity to each of the sprites within the at least one dynamic sprite montage, and wherein the visible time stamp corresponds to a time that the corresponding unique event was detected in the video stream.

33. The computer-readable storage medium of claim 29 wherein the user interface further includes a query control for processing user queries relating to the video sprites, and wherein the user queries include any of sprite matching queries, sprite positional queries, and sprite observation time queries.

34. The computer-readable storage medium of claim 29 wherein generating at least one static sprite montage further includes populating one or more of the static sprite montages with one or more user selectable sprite thumbnails.

35. The computer-readable storage medium of claim 29 wherein arranging one or more of the video sprites in fixed positions on a copy of the common background image to create each static sprite montage comprises adjusting a position of one or more of the sprites along a computed trajectory of each sprite so as to minimize potential sprite overlap within the static sprite montage.

36. The computer-readable storage medium of claim 29 wherein creating an animation of one or more of the video sprites on a copy of the common background for generating the at least one dynamic sprite montage further comprises staggering an individual start time for the animation of each individual sprite in the animation so as to minimize potential sprite overlap within the dynamic sprite montage during animation of the dynamic sprite montage.

* * * * *